April 1, 1958 C. W. MILLER ET AL 2,829,307

OSCILLATOR CONTROLLED AUTOMATIC HEADLAMP DIMMER SYSTEM

Filed Oct. 12, 1955 2 Sheets-Sheet 1

INVENTORS
Charles W. Miller Jr.
BY Harold E. Todd
R. E. Fowler
ATTORNEY

April 1, 1958 C. W. MILLER ET AL 2,829,307

OSCILLATOR CONTROLLED AUTOMATIC HEADLAMP DIMMER SYSTEM

Filed Oct. 12, 1955 2 Sheets-Sheet 2

INVENTORS
Charles W. Miller, Jr.
BY Harold E. Todd
R. C. Fowler
ATTORNEY

United States Patent Office 2,829,307

Patented Apr. 1, 1958

2,829,307

OSCILLATOR CONTROLLED AUTOMATIC HEADLAMP DIMMER SYSTEM

Charles W. Miller and Harold E. Todd, Anderson, Ind., assignors to General Motors Corporation, Detroit, Mich., a corporation of Delaware Application October 12, 1955, Serial No. 539,968

12 Claims. (Cl. 315—83)

This invention relates to light sensitive control means and more particularly to a low voltage light sensitive system for automatically dimming the headlamps of an automotive vehicle.

There are currently on the market light sensitive means for automatically switching filament energization in automotive headlamps which are dependent upon the light impinging on the front of the vehicle. They contain components that require voltages higher than that of the electrical systems of the vehicles and, therefore, are supplied with a special power supply section. These usually include a vibrator for periodically interrupting the circuit and a power transformer both of which are elements of some expense.

It is therefore an object in making this invention to provide a light sensitive control system in which all the elements thereof will operate on the available vehicle voltage or less.

It is a further object in making this invention to provide a light sensitive control system for automatically switching headlamp beams which will operate completely on the generator-battery voltage available on the vehicle.

It is a further object in making this invention to provide a light sensitive headlamp beam control system in which an oscillator is energized or cut off by the amount of light falling on a photocell to control beam energization.

Figure 1:
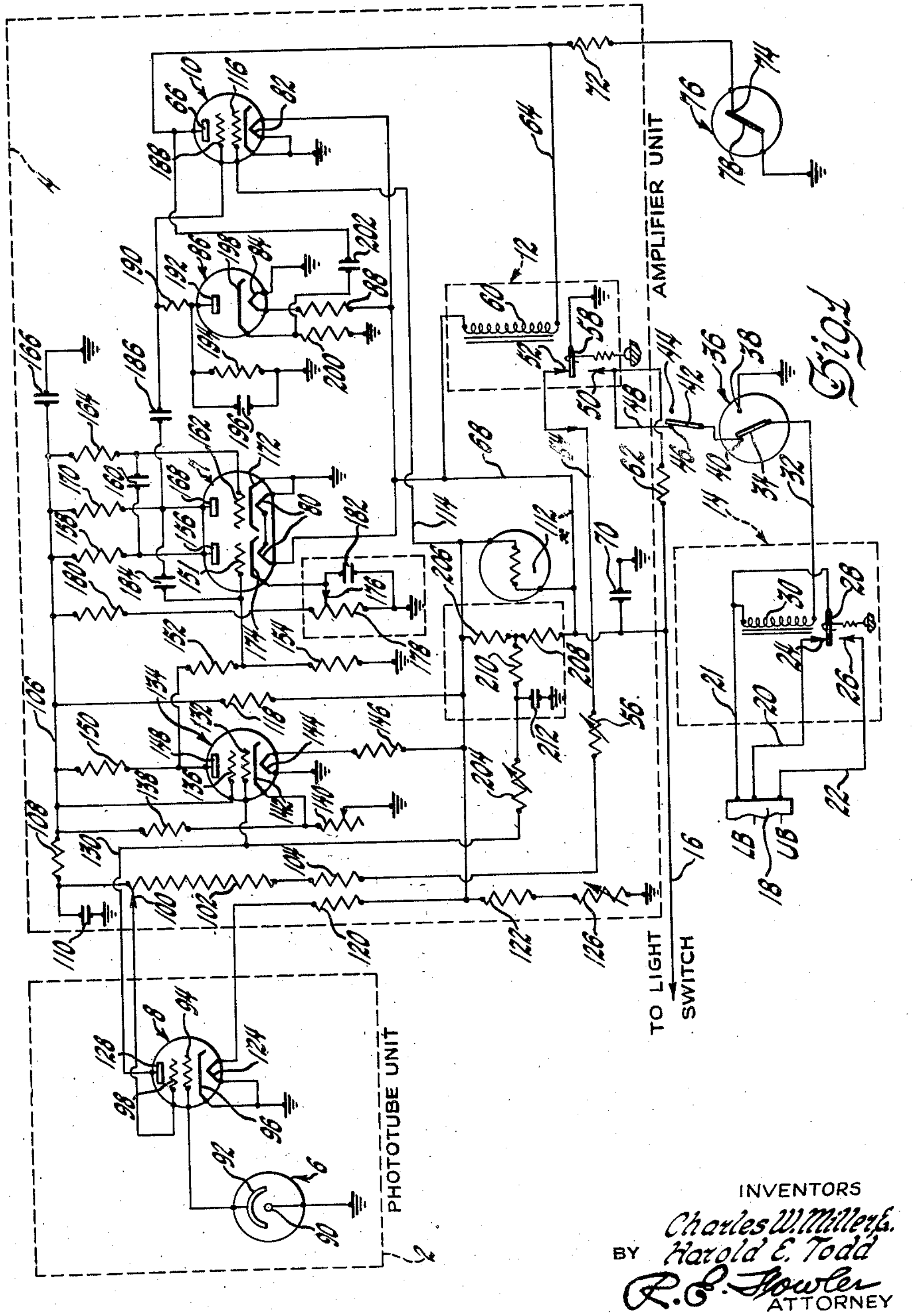
Figure 2:
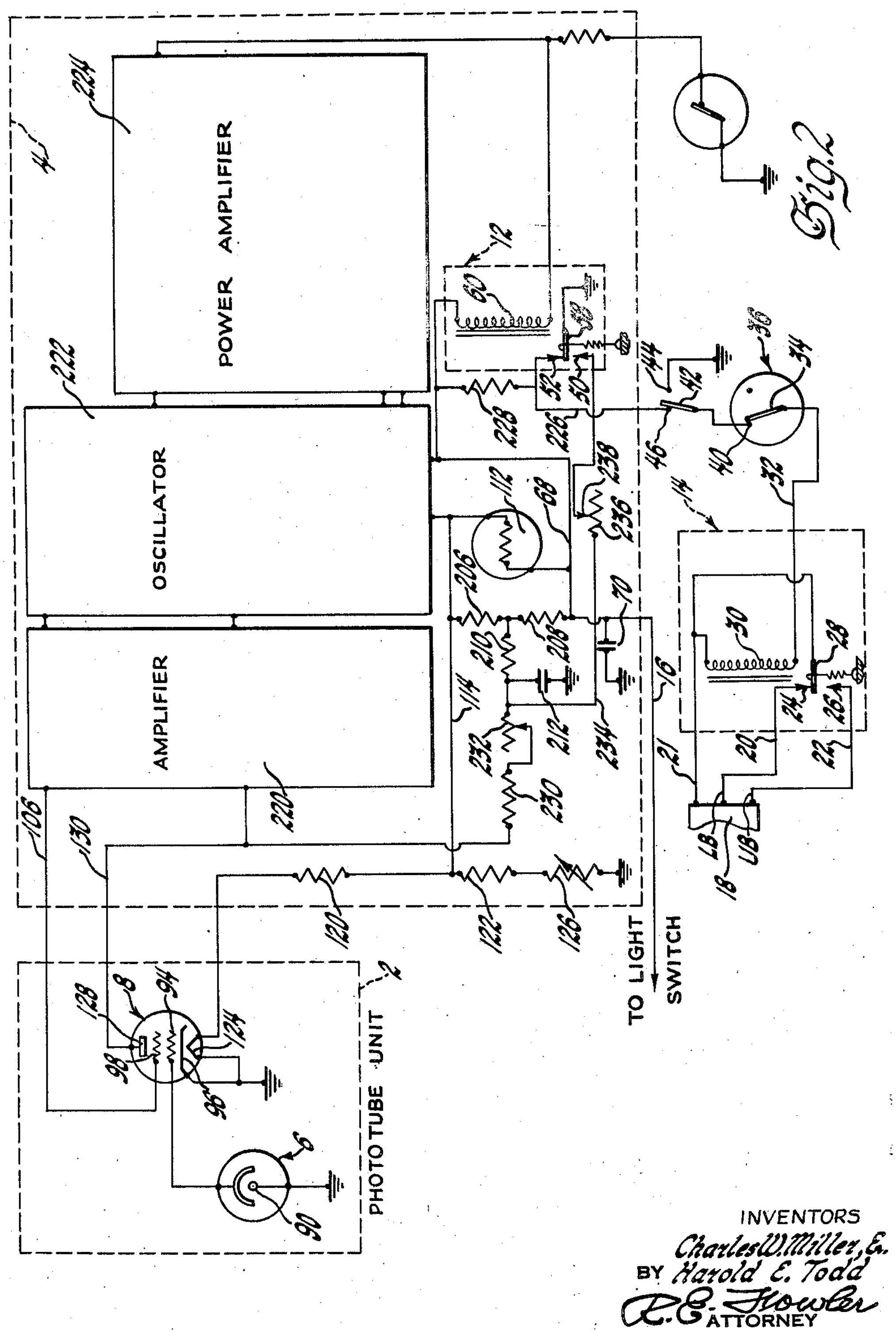

With the above and other objects in view the embodiments of our invention will be best understood by reference to the following specification and claims and the illustrations of the drawings in which:

Figure 1 is a circuit diagram of a light sensitive control system incorporating our invention; and Figure 2 is a block and circuit diagram illustrating a modified form of our invention.

Referring now in particular to Figure 1, it will be seen that the system consists generally of two units, one a phototube unit 2 and the other a main amplifier and control unit 4. The phototube unit houses a phototube 6 and a pre-amplifier stage including tube 8. The main amplifier and control unit 4 is provided with an oscillator of multivibrator type which is turned on and off by the light falling on the phototube 6. The multivibrator includes the dual triode tube 7. The output of the oscillator biases a power amplifier tube 10 to cut off when the oscillator is running and permits the power tube to conduct when the oscillator is not operating. The tube 10 in turn controls the sensitive switching relay 12 which through power relay 14 outside of the unit actually switches the headlamp filaments. The system is supplied with power by line 16 which extends to the car power system.

The wiring harness 18 of the car contains wires 20 and 22 which are connected to the lower and upper beam filaments, identified as LB and UB, respectively. The wiring harness 18 likewise includes a 12-volt line 21 which is connected to the source of power. The wire 20 is connected to the stationary contact 24 of power relay 14 and wire 22 is connected to spaced stationary contact 26 of the same relay. The pivotally mounted armature 28 of the relay moves between the two contacts 24 and 26 and alternately engages these. The armature is spring biased downwardly as shown into engagement with stationary contact 26 but is pulled upwardly when the relay coil 30 is energized. One terminal of relay coil 30 is connected to the power line 21 which is also connected directly to the oscillating armature 28. The other terminal of relay coil 30 is connected through conductive line 32 to the movable arm 34 of the standard foot dimmer switch 36. One stationary contact 38 of the switch 36 is directly connected to ground and the other stationary contact 40 of this switch 36 is connected to the movable switch arm 42 of a manual-automatic switch which alternately engages two contacts 44 and 46.

Contact 46 is connected through conductive line 48 with stationary contact 50 of the sensitive control relay 12. This relay is controlled by the oscillator output. A second spaced contact 52 of the sensitive relay 12 is connected through line 54 to one terminal of a variable resistance 56 which is in supply line to the screen grid of the pre-amplifier tube 8 in the phototube unit. Switch 58—52 changes the sensitivity of the amplifier stage as will be more effectively explained at a later point. Movable armature 58 of the sensitive relay 12 is spring biased downwardly as shown in Figure 1 into engagement with stationary contact 50. However, when the relay coil 60 is energized it pulls the armature 58 up into engagement with stationary contact 52 and breaks the circuit with stationary contact 50. Supply line 16 is connected through resistor 62 to stationary contact 50 and to line 48. As mentioned above the relay coil 60 depends upon the conduction through tube 10 for its energization and when a sufficient amount of current flows through this tube the armature 58 is pulled up, but when an insufficient amount of current flows therethrough, the spring bias overcomes the attracting effect of the coil and the armature is pulled downward into engagement with contact 50.

One terminal of the coil 60 is connected through conductive line 64 with the plate 66 of the tube 10. The other terminal of the coil 60 is connected through tie line 68 with the power line 16. A condenser 70 is connected between the line 68 and ground. Line 64 is also connected through a resistor 72 to stationary contact 74 of an override switch 76, the movable switch arm 78 of which is grounded. When this switch 76 is closed, an auxiliary grounding circuit is provided for the control coil 60 of the relay and it will, therefore, be energized irrespective of any conduction through tube 10 and the operator can, therefore, always bring his lights to high beam by manually closing this switch. The supply line 68 is connected to the filaments 80 of the tube 7, to the filament 82 of the tube 10, and through a protective resistor 88 to the filament 84 of a diode rectifier tube 86.

The phototube 6 consists of an anode 90 which is grounded and a cathode 92 which is directly connected to the control grid 94 of the tube 8. The cathode 96 of this tube is directly grounded. The screen grid 98 of the tube 8 is connected to an adjustable tap 100 on a potentiometer which consists of two resistances 102 and 104 connected in series between the filtered power line 106 and the left-hand terminal of the adjustable resistance 56 hereinbefore described. A resistance 108 is connected between the filtered power line 106 and the upper end of the resistance 102. A by-pass condenser 110 is connected between the upper end of resistance 102 and ground. Ballast tube 112 is connected between the unregulated power supply line 16—68 and a regulated power supply line 114. That line is connected directly to a screen grid 116 in the power output tube 10 to provide a bias therefor and also through a resistor 118 to the filtered regulated line 106. Line 114 is likewise connected to a point intermediate the two resistors 120 and 122 which are connected in series relationship in circuit to the filament 124 of the pre-amplifier tube 8. An adjustable resistor 126 is connected between the lower end of resistor 122 and ground.

The plate 128 of the pre-amplifier tube is connected directly through line 130 with the control grid 132 of the amplifier tube 134 which is connected ahead of the multivibrator including tube 7 and which controls the multivibrator. The screen grid 136 of tube 134 is directly connected to the regulated and filtered supply line 106. A voltage divider consisting of series resistors 138 and 140, the latter of which is adjustable, is connected between filtered line 106 and ground. The cathode 142 of tube 134 is connected to a point intermediate the two resistances 138 and 140 to provide cathode bias. The filament 144 of tube 134 is supplied with power from line 114 through a resistor 146. The plate 148 of tube 134 is supplied by power from line 106 through resistance 150. The variation, therefore, in light falling upon the phototube 6 will change the output voltage of the plate circuit of the tube 134 which, therefore, varies the biasing voltage applied to the control grid 151 of the first section of the tube 7.

The system is so designed that with no light falling on the phototube the voltage of grid 151 is sufficiently low to block off that section and make it nonconductive. The oscillator, therefore, is not in operation. Two resistances 152 and 154 are connected in series between the plate 148 of tube 134 and ground. The control grid 151 is directly connected to a point between these two resistances to provide the grid bias. The plate 156 of the first section of tube 7 is supplied with power from line 106 through dropping resistor 158 and is connected through a coupling condenser 160 to the control grid 162 of the second section of the tube 7. This grid 162 is likewise connected through a resistor 164 to the power supply line 106. A filtering condenser 166 is connected between line 106 and ground. The plate 168 of the second section of the tube 7 is supplied with power from line 106 through resistor 170. Cathode 172 of the second section of the tube 7 is directly grounded and cathode 174 of the first section of the tube 7 is connected to a variable tap 176 on resistor 178 to provide an adjustable bias therefor. Resistor 178 is connected in series relation with resistance 180 between power line 106 and ground. A condenser 182 is connected directly between tap 176 on the resistance 178 and ground. A feedback condenser 184 is connected between control grid 151 of the first section of the tube 7 and plate 168 of the second section to provide multivibrator action.

A coupling condenser 186 couples the output of the multivibrator oscillator to the control grid 188 of the power amplifier tube 10. The output of this coupling condenser is likewise coupled through resistor 190 to the plate 192 to the diode rectifier 86. The plate 192 is likewise connected through a parallel circuit of resistor 194 and condenser 196 to ground. The cathode 198 of the rectifier 86 is connected to ground through resistor 200. The cathode 198 is also connected through a coupling condenser 202 to the plate 66 of the power amplifier tube 10.

The control grid 132 of the first amplifier stage in the main unit is connected directly to one terminal of a variable resistance 204, the opposite terminal of which is connected to a filter section consisting of resistances 206 and 208 in series across lines 16 and 114 and resistance 210 connected to an intermediate point between resistances 206 and 208 and to one terminal of the variable resistance 204. A condenser 212 is connected between the left-hand end of the resistance 210 and ground and completes the filter section. The variable resistances 56 and 204 adjust the sensitivity of the amplifier for different phases of operation and are known as the dim and hold controls. In other words, the adjustment of resistance 56 determines the point in light intensity at which the headlights will switch from upper beam to lower beam and the adjustment of resistance 204 will in turn determine the point at which the system will switch from lower beam to upper beam.

The operation of the system is s follows. Assuming first that the operator desires automatic operation, he therefore closes the switch 42—46 to place the system on automatic operation and likewise operates the foot dimmer switch so that it will assume the left-hand position. If the car is operating in an area where there is little illumination or on country driving, the power amplifier tube 10 will be conducting to energize the coil 60 to hold its armature 58 in upper position. As long as the armature 58 is in upper position the circuit to the energizing coil 30 of the power relay 14 is not completed and the spring bias will hold the armature 28 in its lower position to complete an obvious circuit from the power line 21 through armature 28, contact 26, to the upper beam filaments. At this time the resistance 56 is included in circuit and affects the bias on the pre-amplifier tube 8. The bias on the control grid 132 of the first amplifier stage in the main unit is at this time determined by the setting of the resistance 204. The oscillator is nonoperative due to the fact that the bias on grid 151 is sufficiently low to maintain the first section cut off.

As a car approachs and additional light now falls on the photocell 6, the bias on control grid 94 thereof will change, causing this tube to conduct more readily. As this occurs the voltage on the plate 128 thereof will be decreased and since the control grid 132 of the tube 134 is directly connected therewith that voltage will likewise decrease. This tends to decrease or cut off the flow through tube 134 and the conduction through that tube will become lower. This will result in an increase in the voltage on plate 148 and in turn an increase in the voltage on control grid 151 which will permit that first section of tube 7 to conduct. When this occurs, through conventional multivibrator action, the second section of that tube which has been conducting is cut off. This cutoff will tend to drive the control grid 151 in the first section down to cut that section off again and the oscillator action will continue as long as the basic potential on the control grid 151 remains sufficiently high to permit it to conduct on alternate half cycles.

The output of the multivibrator applied through coupling condenser 186 to the control grid 188 of tube 10 drives this control grid 188 negative since current can flow from the cathode to grid but not in the other direction. This causes a series of negative voltage pulses to build up on grid 188, tending to cut off this tube. When the conduction through tube 10 becomes sufficiently lowered so that coil 60 drops armature 58, a circuit will be completed by which coil 30 of the power relay may be energized. This is from line 21 through coil 30, line 32, switch arm 34, contact 40, switch arm 42, contact 46, line 48, contact 50, armature 58 to ground. The energization of coil 30 will cause it to attract its armature 28, causing it to move upwardly as shown in Figure 1 away from contact 26 and into engagement with contact 24. This opens the circuit to the upper beam filaments, causing the dimming of the headlamps.

If it is desired to overrule or override the automatic control so as to permit the beams to be returned to high beam energization, the operator may close override switch 76. This completes an auxiliary energizing circuit for the sensitive relay coil 60 as follows: line 16, line 68, coil 60, line 64, resistor 72, contact 74, armature 78 to ground. This energization causes coil 60 to again attract its armature 58 to break the energizing circuit just traced for the power relay and permit that armature to again close its upper contact and at the same time armature 28 of the power relay will drop to switch from low beam power to upper beam energization.

The previously mentioned adjustment of the sensitivity of the amplifying system by changing the setting on variable resistors 56 and 204 is provided to prevent continuous cycling of the system due to a decrease in oncoming light following the dimming of the oncoming vehicle's headlamps. For example, if the car equipped with the current system were being operated on a country road and a car approached from the opposite direction, causing the lights to be automatically dimmed, the oncoming driver would, in courtesy, likewise dim his headlamps. Thus very shortly after the automatic system had switched to low beam position the amount of light falling on the controlling photocell would be materially reduced and unless some provision were made the system would return to high beam energization. By switching out the resistance 56 when the system switches from high to low beam, the amplifier system is made many times more sensitive than it was in high beam position, and thus even though the oncoming vehicle's headlamps are dimmed, there will be a sufficient amount of light available to maintain the lights on low beam. The point at which the lights are returned to high beam or the minimum illumination that will keep them on low beam is determined by the setting of resistance 204 as that is the only resistance in circuit at that time. The adjustment of resistance 56 will determine that point at which the lights will be dimmed or switch from high to low beam. Thus as long as the switches 36 and 42 are in the positions shown, the headlamp beam energization will be controlled by the light sensitive system. If switch 42 is moved to contact 44, the headlamp circuit will be disconnected from the automatic section and will be controlled manually by operation of the conventional foot dimmer switch 36, alternate actuation of said switch providing dim and bright lights.

The circuit of Figure 2 is similar to the one shown in Figure 1. Portions which are the same have been shown in block diagram form and specific parts which are identical in both instances have been given the same reference characters. In general the system consists of the same two units, the phototube unit 2 and the amplifier main power unit 4. However, the amplifier including the tube 134 has been shown in block diagram labeled amplifier 220. The oscillator controlled by said amplifier is shown in block 222, labeled oscillator, and the power amplifier shown in block 224. The power amplifier as before controls the flow of current through the coil 60 of the sensitive relay 12 and the movable armature 58 oscillates between the same two fixed contacts 50 and 52. The wiring harness 18 contains line 21 and conductors 20 and 22 are connected to the lower beam and upper beam filaments LB and UB. Lines 20 and 22 are likewise connected to stationary contacts 24 and 26 respectively as in the previous instance. The pivotal armature 28 of the power relay 14 oscillates between two fixed contacts and is moved by energizing coil 30 upward or by a spring bias to the lowermost position. Coil 30 is connected by line 32 to the movable switch arm 34 of the standard foot dimmer switch 36 which is connected in series with the manual automatic switch 42—46. The stationary contact 46 of this switch is, however, connected through line 226 with upper stationary contact 52 of the sensitive relay 12 and through dropping resistor 228 to the unregulated power supply line 68.

The ballast tube 112 connected to line 68 still provides regulated current to the system. The filament 124 of the pre-amplifier tube 8 is connected as before to one end of a voltage divider consisting of series resistors 120, 122, and 126 and regulated power supply line 114 is connected to a point intermediate resistors 120 and 122. However, the screen grid 98 of the tube 8 is connected in this instance directly to the regulated and filtered power line 106 instead of to the potentiometer and to the dim control resistor 56. The sensitivity controls are, therefore, different. The plate 128 of the tube 8 is connected directly through line 130 as in the previous instance, but that line now extends to a resistor 230 which is connected in series with a variable resistance 232 and thence to resistor 210 of the filter section. The filter section is completed by resistors 206 and 208 in series across lines 114 and 16 as in the previous instance. The condenser 212 extends from the left-hand end of the resistor to ground. Variable resistance 232 is now the dim control or provides the adjustment at what light intensity the system will switch to dim or low beams. The right-hand end of the variable resistance 232 is likewise connected through line 234 to one terminal of a variable resistance 236 which has an adjustable tap 238 thereon connected directly to stationary contact 50 of the sensitive relay 12.

Thus the difference between the system of Figure 1 and that shown of Figure 2 is that the dim control has been moved from the screen grid circuit of tube 8 into the plate circuit of the same tube so that now both the dim control 232 and the hold control 236 are in the plate circuit and both affect the plate voltage rather than in any way affect the bias voltage on the screen grid. The operation of the system insofar as it follows the general lines is the same as in Figure 1, but in order to adjust the sensitivity for dim and hold resistors 232 and 236 respectively are now set to determine those points of illumination for switching back and forth from high to low beams.

We claim:

1. In a light sensitive control system, a source of electrical power, control switching means connected to said source, light sensitive means, multi-element amplifying means connected to the control switching means to determine the operation thereof, said light sensitive means being connected to one element of the means, biasing means connected to another element and to the source of power, said biasing means being also connected to said control switching means to vary the bias on the other element dependent upon the position of the control switching means.

2. In a light sensitive control system, a source of electrical power, control switching means connected to said source, multi-element amplifying means, one element of which is connected to said control switching means to determine the operation thereof, a light sensitive means connected to a second element to vary the conductance thereof, and biasing means connected to the source of power, the control switching means and a third element to vary the bias on the third element dependent upon the switching position.

3. In a light sensitive control system, a source of electrical power, switching means connected to the source and to means to be controlled, a coil for actuating said switching means, electron tube amplifying means connected to said coil and source and having a plurality of control electrodes, a light sensitive means connected to one of the control electrodes, biasing means connected to said source, a further control electrode and to the switching means to vary the bias on the further electrode, dependent upon switch position.

4. In a light senitive control system, a source of electrical power, switching means connected to the source and to means to be controlled, amplifier means connected to said switching means to operate the same, an amplifier having an input and an output, said output being connected to said amplifying means, light sensitive means connected to said input, a control element for said amplifier, variable resistance means connected between the source of power, the control element element and the switching means to vary the bias on the control element, and additional variable resistance means connected between the output of the amplifier and the source of power to adjust the output voltage.

5. In a light sensitive control system, a source of electrical power, switching means connected to the source and to means to be controlled, amplifying means connected to said switching means to operate the same, an amplifier having an input and an output, said output being connected to said amplifying means, light sensitive means connected to said input, a control element for said amplifier, variable resistance means connected between the source of power, the control element and the switching means to vary the bias on the control element, and additional variable resistance means connected to the output of the amplifier and filter means connected between the additional variable resistance means and the source of power to adjust and filter the power to the output circuit.

6. In a light sensitive control system, a source of electrical power, switching means connected to the source and to means to be controlled, a coil for actuating said switching means, a multi-grid amplifying tube having a plate and cathode, means interconnecting said plate to said coil for controlling the flow of current therethrough, adjustable resistance means connected between the source and plate to adjust the plate voltage, light sensitive means connected to one of the grids of the amplifying means, and adjustable biasing means connected to a second grid, the power source and the switching means to vary the grid bias depending on the switch position.

7. In a light sensitive control system, a source of electrical power, a control relay switch including a coil connected to said power source, electron means whose conductivity may be controlled connected in series with the coil to control the flow of current therethrough, amplifying means having control electrodes, light sensitive means connected to one of the control electrodes and varying the voltage thereon with fluctuations in light intensity, means for applying a regulated filtered voltage on another of said control electrodes whose value will vary depending upon the position of the relay switch and means interconnecting the amplifying means and the electron means so that the output of the amplifying means controls the energization of the relay coil through light variations and the sensitivity of the amplifier is varied between switch positions.

8. In light sensitive control means, multi-filament lamps, a source of electrical power, switching means interconnecting said filaments and said source for alternate energization, means for actuating said switch, a multi-element electron tube having a plate, cathode and plurality of grids, said plate being connected to said means for actuating said switch, filtering and adjustable biasing means connected to said plate to vary the voltage thereof, light sensitive means connected to one grid, and adjustable biasing means connected to another grid and to the switching means to vary the bias thereon dependent upon switch position.

9. In light sensitive control means, multi-filament lamps, a source of electrical power, switching means interconnecting said filaments and said source for alternate energization, means for actuating said switch, a multi-element electron tube having a plate, cathode and plurality of grids, said plate being connected to said means for actuating said switch, filtering and adjustable biasing means connected to said plate to vary the voltage thereof, light sensitive means connected to one grid, and additional adjustable biasing means connected to one end of the filtering means and to the switching means for insertion in or removal of the same from the circuit upon operation of the switching means.

10. In light sensitive control means, multi-filament lamps, a source of electrical power, switching means interconnecting said filaments and said source for alternate energization, means for actuating said switch, a multi-element electron tube having a plate, cathode and plurality of grids, said plate being connected to said means for actuating said switch, filtering and adjustable biasing means connected to said plate to vary the voltage thereof, light sensitive means connected to one grid, additional adjustable biasing means connected to one end of the filtering means and to the switching means for insertion in or removal of the same from the circuit upon operation of the switching means, and conductive means directly connecting a second grid to the power supply.

11. In light sensitive control means, multi-filament lamps, a source of electrical power, switching means interconnecting said filaments and said source for alternate energization, means for actuating said switch, a single pole double throw switch connected to the means for actuating the switch to control the same, a second single pole double throw switch connected in series with the first to provide selective actuation of the first, and light controlled switching means connected to one pole of the second single pole switch to provide automatic light control of the first-named switch or manual operation thereof by the first single pole double throw switch.

12. In light sensitive control means, multi-filament lamps, a source of electrical power, switching means interconnecting said filaments and said source for alternate filament energization, means for actuating said switching means, voltage regulating and filtering means connected to said source of power, a multi-element electron amplifier tube having a plate, cathode and at least one grid, said plate being connected to said means for actuating said switching means and to the voltage regulating and filtering means, variable resistance means connected between the plate and the voltage regulating and filtering means to vary the sensitivity of the apparatus and light sensitive means connected between ground and grid of said amplifier tube to vary the conductivity of the amplifier tube as ambient light on the light sensitive means varies, but the amplifier plate voltage is maintained substantially stable upon fluctuation of the source voltage.

References Cited in the file of this patent

UNITED STATES PATENTS 2,632,040 Rabinow ---------------- Mar. 17, 1953

OTHER REFERENCES

Automatic Headlight Dimmer—"Radio Electronics," vol. 24, #10, October 1953.